Patented June 16, 1953

2,641,801

UNITED STATES PATENT OFFICE 2,641,801

METHOD OF HEAT HARDENING OF FRICTION MATERIALS

Clyde S. Batchelor, Upper Stepney, and Henry J. Cofek, Bridgeport, Conn., assignors to Raybestos-Manhattan, Inc., Passaic, N. J., a corporation of New Jersey No Drawing. Application February 8, 1949, Serial No. 75,296

4 Claims. (Cl. 18—48)

This invention relates to improvements in a method of curing friction materials and refers particularly to a method of curing materials of this class wherein the curing time is materially reduced and the quality of the cured materials is uniformly improved.

In the manufacture of friction materials such as automotive clutch facings, brake linings and the like, the ingredients which generally comprise asbestos and a heat curable binder usually carry a solvent for the binder in order that the materials may be conveniently mixed, formed and handled. The function of such solvent is substantially complete up to the point where the frictional material is about to be cured. The solvent plays no part in the finished product and as a matter of fact its presence is detrimental to the product particularly during the curing period.

Accordingly, one of the operations performed during the curing period is to drive off the solvent which up to that point has served its purpose. Curing of the binder, in itself, is not a particularly difficult operation since curing is essentially a function of time and temperature, that is, as temperature of curing is increased, time is shortened, and vice versa. However, the presence of the solvent in the friction material mass complicates the problem of curing.

The binders ordinarily used for automotive friction materials comprise (a) combinations of rubber and drying oil, (b) all drying oils, (c) oil modified phenolics and others. The solvents employed are any of the well known solvents of the particular binders used. These solvents, however, rather than having a sharp distillation point, boil or distill over a range of temperatures. For example, some of the solvents heretofore employed comprise (a) mineral spirits having a distillation range between about 290° F., and 375° F., (b) hydrocarbon solvent blends having a distillation range of between about 265° F., and 340° F., (c) varnish makers' naphtha having a distillation range of between about 194° F., and 302° F., and (d) blends of the above solvents with or without others having a distillation range of between about 200° F., and 400° F. These solvents vaporize gradually or in steps but generally in a straight line relationship with temperature.

Heretofore, solvents have been driven from the friction materials during cure by depositing the friction materials in a hot air or convection furnace and gradually raising the temperature of the furnace from about room temperature to about the temperature of the highest boiling solvent. For example, a typical commercial curing run is set forth as follows:

The friction materials were introduced into a convection furnace at about room temperature and over a period of about 1½ hours the temperature of the furnace was gradually raised to about 180° F., the temperature was then maintained constant at 180° for about 12 hours; then over a period of about ½ hour the temperature was raised to about 225° F., and held constant at that temperature for about 5 hours; over a period of about ½ hour it was then raised to about 250° F., held constant at that temperature for about 5 hours and again raised over a period of about ½ hour to 325° F., at which it was maintained constant until cure was effected which occupied a period over about 5 to 10 hours. In all, the cure occupied a span of about 30 to 35 hours.

It was found that when the temperature was increased slightly above the increments in the various steps mentioned hereinabove, an undesirable condition took place which was referred to as case hardening. By case hardening was meant that the outer surfaces of the friction materials would begin to cure or harden before the solvent in the interior was completely driven off and, hence, solvent was trapped in the interior of the friction material which inhibited curing of the interior of the material. Frequently, such entrapped solvent, upon further heating of the friction material or in the use of the friction material, caused the friction material to blister, rupture or crack. Accordingly, it has heretofore been believed in the art that slow curing of friction materials was necessary and that temperature increments of only predetermined spans could be employed without encountering the disadvantages herein noted.

We have found, however, that although relatively slight departures from a predetermined maximum temperature considered critical can not be made without encountering case hardening, the curing time can be markedly decreased by subjecting the materials to relatively large initial temperature increases.

For example, with a friction material of the asbestos-binder type using a solvent having a distillation range terminating at about 300° F., complete curing was effected in about 6 hours. This was accomplished by introducing the friction units at about room temperature into an unpreheated convection furnace; raising the oven temperature to 300° F., and thus bringing the friction units to a temperature of about 300° F., in a period of about 2 hours; thereafter over a period of about 2½ hours raising the temperature of the units to about 350° F., or slightly higher and holding said temperature constant for about 1½ hours. The friction units were found to be cured uniformly throughout and otherwise satisfactory in all respects.

As another example, friction units of the same type employed in the previous example were introduced at about room temperature to a similar furnace which was preheated to about 450° F.; the units were thus rapidly heated, and shortly after introduction the furnace temperature was reduced to about 300° F., and subsequently, over a period of about 5 hours, was raised gradually in small increments to a temperature of about 380° F. At the end of five hours the units were found to be completely cured throughout and satisfactory in all respects.

In general our present invention resides in subjecting the friction material to an initial temperature in the neighborhood of the temperature of distillation of the highest boiling fraction of the solvent, to bring the units in temperature up to the oven temperature as rapidly as possible.

It appears that subjecting the friction material to heat at relatively high temperatures, that is, temperatures approximately at or above the distillation temperature of the highest boiling fraction of the solvent, causes rapid vaporization of the solvent to occur. Curing, of course, commences immediately and inasmuch as curing is an exothermic reaction, the heating of the friction material would appear to proceed at a rapid rate. However, the rapid evolution of vapors, by virtue of the latent heat of vaporization, tempers the heating of the material. This tempering is particularly advantageous at the exposed surfaces of the material since it tends to cool or chill said surfaces and retard the rate of cure at the surfaces. Hence, the condition heretofore encountered of case hardening does not occur and the friction material cures or hardens uniformly throughout its thickness at a substantially uniform rate.

It can readily be appreciated that substantially all of the solvent fractions, being quickly raised to a temperature above their respective boiling points vaporize extremely rapidly and, hence, their cooling effect is very pronounced, particularly at the surfaces of the material where all vapors must pass in their exodus from the material. This effect brings about the control of the rate of cure which prevents curing of the surfaces to the extent of sealing the outer surfaces before all vapors in the interior have had a chance to escape. After the elimination of the vapors, curing can be made to take place rapidly, eliminating the necessity for the long cure period heretofore deemed essential.

Although the present invention has hereinbefore been described in conjunction with a furnace of the convection type, it is to be understood that, broadly, the invention is not limited to any specific means for supplying the heat to the friction materials. Radiant heat furnaces, induction heat furnaces or infra-red heat may be employed effectively, so long as the friction material is substantially initially exposed to heat at a temperature of about or above the boiling or distilling temperature of the highest boiling fraction of the solvent used.

We claim as our invention:

1. A method of heat hardening friction materials of the type comprising asbestos, an uncured thermosetting binder and an organic solvent for said binder which comprises, subjecting said friction material to heat at an initial temperature which in the absence of the solvent would effect rapid cure of said binder at the surfaces of the friction material, said temperature being at least as high as the minimum distilling temperature of the solvent present, and continuing said heating at at least said temperature until substantially all of the solvent has been vaporized and the binder cured to infusibility.

2. A method of heat hardening friction materials of the type comprising asbestos, an uncured heat curable binder and an organic mixture which boils over a range of temperature which comprises, subjecting said friction material to heat at an initial temperature which in the absence of the solvent would effect rapid cure of the binder, said temperature being at least as high as the minimum distilling temperature of the highest boiling temperature solvent fraction present to rapidly vaporize said solvent, and continuing said heating at at least said initial temperature until substantially all of the solvent has been vaporized and the friction material hardened to substantial infusibility.

3. A method of heat hardening friction materials of the type comprising asbestos, an uncured thermosetting binder and an organic solvent for said binder which comprises, subjecting said friction material to initial heat at an elevated temperature sufficiently high to effect rapid cure of the binder and above the boiling temperature of the solvent to cause rapid evaporation of the solvent at a rate such as to cool the exterior surfaces of the friction material and prevent surface hardening thereof before substantially all of the solvent has been removed, and continuing said heating until the friction material is cured to substantial infusibility uniformly throughout its thickness.

4. A method of heat hardening friction material of the type comprising asbestos, a heat hardenable binder and a binder solvent, said solvent being a mixed hydrocarbon material having fractions boiling above the curing temperature of said binder, which comprises subjecting said friction material, before the binder thereof has been heat hardened, to heating in a zone having a temperature above that of the binder cure temperature and at least as high as the minimum distilling temperature of the highest boiling solvent fraction, whereby to rapidly and substantially distill off contained solvent from the friction material while causing the binder content thereof to be cooled by the evaporation of the solvent and thereby inhibit cure thereof prior to substantial evaporation of the solvent content.

CLYDE S. BATCHELOR.
HENRY J. COFEK.

References Cited in the file of this patent

UNITED STATES PATENTS

| Number | Name | Date |
|---|---|---|
| 1,766,932 | Novak | June 24, 1930 |
| 1,905,225 | Hawerlander | Apr. 25, 1933 |
| 2,416,427 | Bonawit et al. | Feb. 25, 1947 |